(12) United States Patent
Thomas et al.

(10) Patent No.: US 11,858,465 B2
(45) Date of Patent: Jan. 2, 2024

(54) CONSOLE ASSEMBLY FOR A VEHICLE

(71) Applicant: Ford Global Technologies, LLC, Dearborn, MI (US)

(72) Inventors: Gregory Paul Thomas, Canton, MI (US); Stephen Neal Jacobsen, Plymouth, MI (US); Michele Marie Mathews, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 153 days.

(21) Appl. No.: 17/356,702

(22) Filed: Jun. 24, 2021

(65) Prior Publication Data

US 2022/0410809 A1 Dec. 29, 2022

(51) Int. Cl.
*B60R 7/04* (2006.01)
*B60N 3/10* (2006.01)
*B60R 11/00* (2006.01)

(52) U.S. Cl.
CPC ............... *B60R 7/04* (2013.01); *B60N 3/102* (2013.01); *B60R 2011/0007* (2013.01)

(58) Field of Classification Search
CPC .... B60R 7/04; B60R 2011/0007; B60N 3/102
USPC ............... 296/37.8, 24.34, 37.1, 37.5
See application file for complete search history.

(56) References Cited

U.S. PATENT DOCUMENTS

| | | | | |
|---|---|---|---|---|
| 6,616,206 B2* | 9/2003 | Luginbill | ............... | B60N 2/793 224/539 |
| 6,851,736 B1* | 2/2005 | Klopp, III | ............... | B60R 7/04 296/208 |
| 7,237,816 B1* | 7/2007 | Singh | ............... | B60R 7/04 296/37.1 |
| 7,455,016 B2* | 11/2008 | Perin | ............... | B60N 2/79 312/307 |
| 7,770,954 B2* | 8/2010 | D'Alessandro | ............... | B60N 2/793 296/37.8 |
| 8,528,956 B1* | 9/2013 | Winiger | ............... | B60R 11/02 296/37.8 |
| 8,616,605 B2 | 12/2013 | Tipshier et al. | | |
| 8,939,491 B2* | 1/2015 | Gillis | ............... | B60R 7/04 296/37.12 |
| 9,156,407 B1* | 10/2015 | Kramer | ............... | B60R 7/04 |
| 10,189,392 B2* | 1/2019 | White | ............... | B60N 2/753 |
| 10,377,317 B2* | 8/2019 | Ranganathan | ............... | B60N 2/793 |
| 10,711,883 B2 | 7/2020 | Keenan et al. | | |

(Continued)

*Primary Examiner* — Joseph D. Pape
(74) *Attorney, Agent, or Firm* — Vichit Chea; Price Heneveld LLP

(57) ABSTRACT

A console assembly for a vehicle includes a compartment side wall. The compartment side wall extends from a compartment floor to an upper rim of the compartment side wall. The console assembly includes a receptacle side wall that extends upward from a receptacle floor of the console assembly to define a receptacle. The console assembly further includes a panel that has opposite first and second sides. The panel is pivotable between a first position and a second position. In the first position of the panel, the panel, the compartment side wall, and the compartment floor define a compartment of the console assembly, and the first side of the panel faces the compartment. In the second position, the panel covers the receptacle of the console assembly and a surface of the first side of the panel is substantially planar with a surface of the compartment floor.

20 Claims, 5 Drawing Sheets

(56) References Cited

U.S. PATENT DOCUMENTS

| | | | |
|---|---|---|---|
| 10,906,445 B2 * | 2/2021 | Johns | B60N 3/002 |
| 2003/0127877 A1 * | 7/2003 | Luginbill | B60N 2/793 |
| | | | 296/37.8 |
| 2003/0155786 A1 | 8/2003 | Kim et al. | |
| 2007/0102945 A1 * | 5/2007 | Mulvihill | B60R 7/04 |
| | | | 296/24.34 |

* cited by examiner

CONSOLE ASSEMBLY FOR A VEHICLE

FIELD OF THE DISCLOSURE

The present disclosure generally relates to a console assembly for a vehicle. More specifically, the present disclosure relates to a console assembly having a panel that is operable between first and second positions.

BACKGROUND OF THE DISCLOSURE

Vehicles typically include console assemblies.

SUMMARY OF THE DISCLOSURE

According to a first aspect of the present disclosure, a console assembly for a vehicle includes a compartment side wall that extends from a compartment floor to an upper rim of the compartment side wall, a receptacle side wall that extends upward from a receptacle floor to define a receptacle, and a panel having a first side and a second side opposite the first side. The panel is pivotable between a first position and a second position. In the first position, the panel, the compartment side wall, and the compartment floor define a compartment, and the first side of the panel faces the compartment. In the second position, the panel covers the receptacle and a surface of the first side of the panel is substantially planar with a surface of the compartment floor.

Embodiments of the first aspect of the present disclosure can include any one or a combination of the following features:
- a door is operably coupled to the compartment side wall and movable between open and closed positions, wherein, in the first position of the panel, access is provided to an upper opening of the compartment in the open position of the door, and the door covers the upper opening of the compartment in the closed position;
- the door is operable to pivot a first direction from the closed position to the open position, and the panel is operable to pivot a second direction from the first position to the second position, wherein the second direction is opposite the first direction;
- a tray is operable to move between a stowed position, wherein the tray is positioned beneath the compartment floor, and a deployed position, wherein the tray is positioned within the receptacle;
- a first shelf is positioned between the receptacle floor and the compartment floor, wherein the receptacle floor is positioned vehicle-downward of the first shelf, and the compartment floor is positioned vehicle-upward of the first shelf;
- the panel is operable to pivot between the first and second positions about a pivot axis, wherein the pivot axis is positioned above the first shelf and vehicle-downward of the compartment floor;
- a second shelf is in a spaced relationship with the first shelf, such that the receptacle floor is positioned between the first and second shelves, wherein a portion of the panel contacts the second shelf in the second position of the panel;
- a platform is in a spaced relationship with the compartment floor, such that the first and second shelves and the receptacle floor are positioned between the platform and the compartment floor, wherein a surface of the platform is substantially planar with the surface of the first side of the panel and the surface of the compartment floor in the second position of the panel; and
- the platform defines a cup holder opening.

According to a second aspect of the present disclosure, a console assembly for a vehicle includes a compartment side wall extending upward from a compartment floor, and a panel having a first side and a second side opposite the first side and being pivotable between a first position and a second position. In the first position, the compartment side wall, compartment floor, and first side of the panel define a compartment. In the second position, a surface of the first side of the panel is substantially planar to a surface of the compartment floor.

Embodiments of the second aspect of the present disclosure can include any one or a combination of the following features:
- a receptacle floor is in a spaced relationship with the compartment floor, and a receptacle side wall extends outward from the receptacle floor to define a receptacle, wherein the panel covers the receptacle in the second position;
- a tray is operable to move between a stowed position, wherein the tray is positioned beneath the compartment floor, and a deployed position, wherein the tray is positioned within the receptacle;
- a first shelf is positioned between the receptacle floor and the compartment floor, wherein the receptacle floor is positioned vehicle-downward of the first shelf, and the compartment floor is positioned vehicle-upward of the first shelf;
- the panel is operable to pivot between the first and second positions about a pivot axis, wherein the pivot axis is positioned above the first shelf and vehicle-downward of the compartment floor;
- a second shelf is in a spaced relationship with the first shelf, such that the receptacle floor is positioned between the first and second shelves, wherein a portion of the panel contacts the second shelf in the second position of the panel;
- a platform is in a spaced relationship with the compartment floor, such that the first and second shelves and the receptacle floor are positioned between the platform and the compartment floor, wherein a surface of the platform is substantially planar with the surface of the first side of the panel and the surface of the compartment floor in the second position of the panel;
- a door is operably coupled to the compartment side wall and movable between open and closed positions, wherein, in the first position of the panel, access is provided to an upper opening of the compartment in the open position of the door, and the door covers the upper opening of the compartment in the closed position; and
- the door is operable to pivot a first direction from the closed position to the open position, and the panel is operable to pivot a second direction from the first position to the second position, wherein the second direction is opposite the first direction.

According to a third aspect of the present disclosure, a console assembly for a vehicle includes a compartment side wall extending upward from a compartment floor, and a panel pivotable between a first position and a second position. In the first position, the compartment side wall, compartment floor, and panel define a compartment. In the second position, the panel covers a receptacle adjacent to the compartment.

Embodiments of the third aspect of the present disclosure can include the following feature:
- the panel includes a first side and a second side opposite the first side, wherein the first side of the panel defines the compartment with the compartment side wall and compartment floor in the first position, and wherein a surface of the first side of the panel is substantially planar to a surface of the compartment floor in the second position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
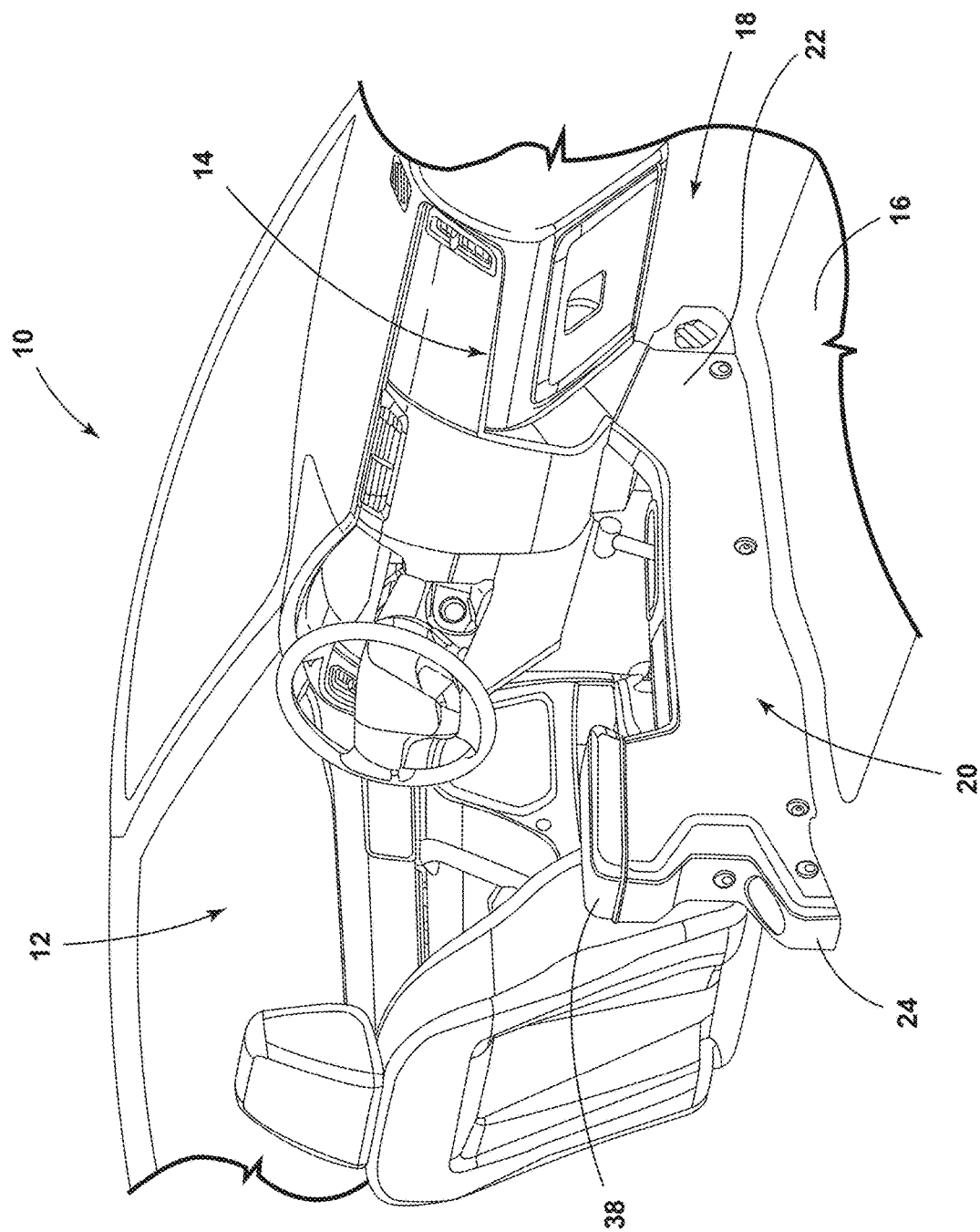
FIG. 1 is a top perspective view of a console assembly positioned within a vehicle interior of a vehicle, according to one embodiment.

Additional features and advantages of the present disclosure will be set forth in the detailed description that follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-5, a console assembly 20 for a vehicle 10 includes a compartment side wall 28. The compartment side wall 28 extends from a compartment floor 26 to an upper rim 30 of the compartment side wall 28. The console assembly 20 includes a receptacle side wall 42 that extends upward from a receptacle floor 40 of the console assembly 20 to define a receptacle 44. The console assembly 20 further includes a panel 68 that has a first side 70 and a second side 72 that is opposite the first side 70. The panel 68 is pivotable between a first position and a second position. In the first position of the panel 68, the panel 68, the compartment side wall 28, and the compartment floor 26 define a compartment 34 of the console assembly 20, and the first side 70 of the panel 68 faces the compartment 34. In the second position, the panel 68 covers the receptacle 44 of the console assembly 20 and a surface 78 of the first side 70 of the panel 68 is substantially planar with a surface 50 of the compartment floor 26.

Referring now to FIG. 1, a vehicle 10 includes a vehicle interior 12. A dashboard 14 is positioned vehicle-upward of a floor 16 of the vehicle 10 at a vehicle-forward end 18 of the vehicle interior 12. The console assembly 20 is positioned within the vehicle interior 12. In various embodiments, the console assembly 20 may be positioned proximate to the vehicle-forward end 18 of the vehicle interior 12. For example, as illustrated in FIG. 1, the console assembly 20 is coupled to the dashboard 14 of the vehicle 10 at a front end 22 of the console assembly 20. The console assembly 20 extends vehicle-rearward from the front end 22 to a rear end 24 of the console assembly 20 that is further than the front end 22 from the dashboard 14 of the vehicle 10.

Figure 2:
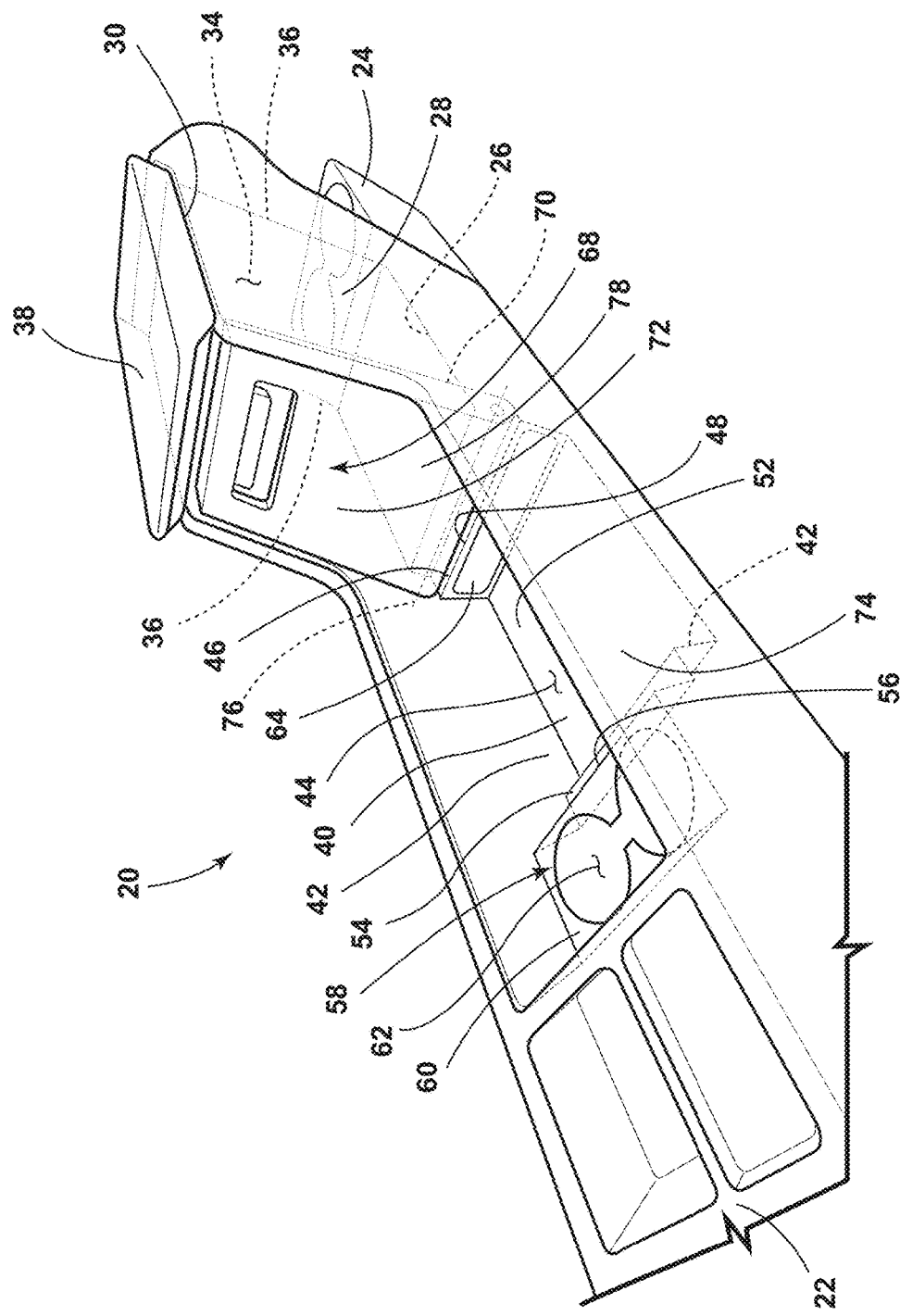
FIG. 2 is a top perspective view of the console assembly, illustrating a panel in a first position, a door in a closed position, and a tray in a stowed position, according to one embodiment.
Figure 3:
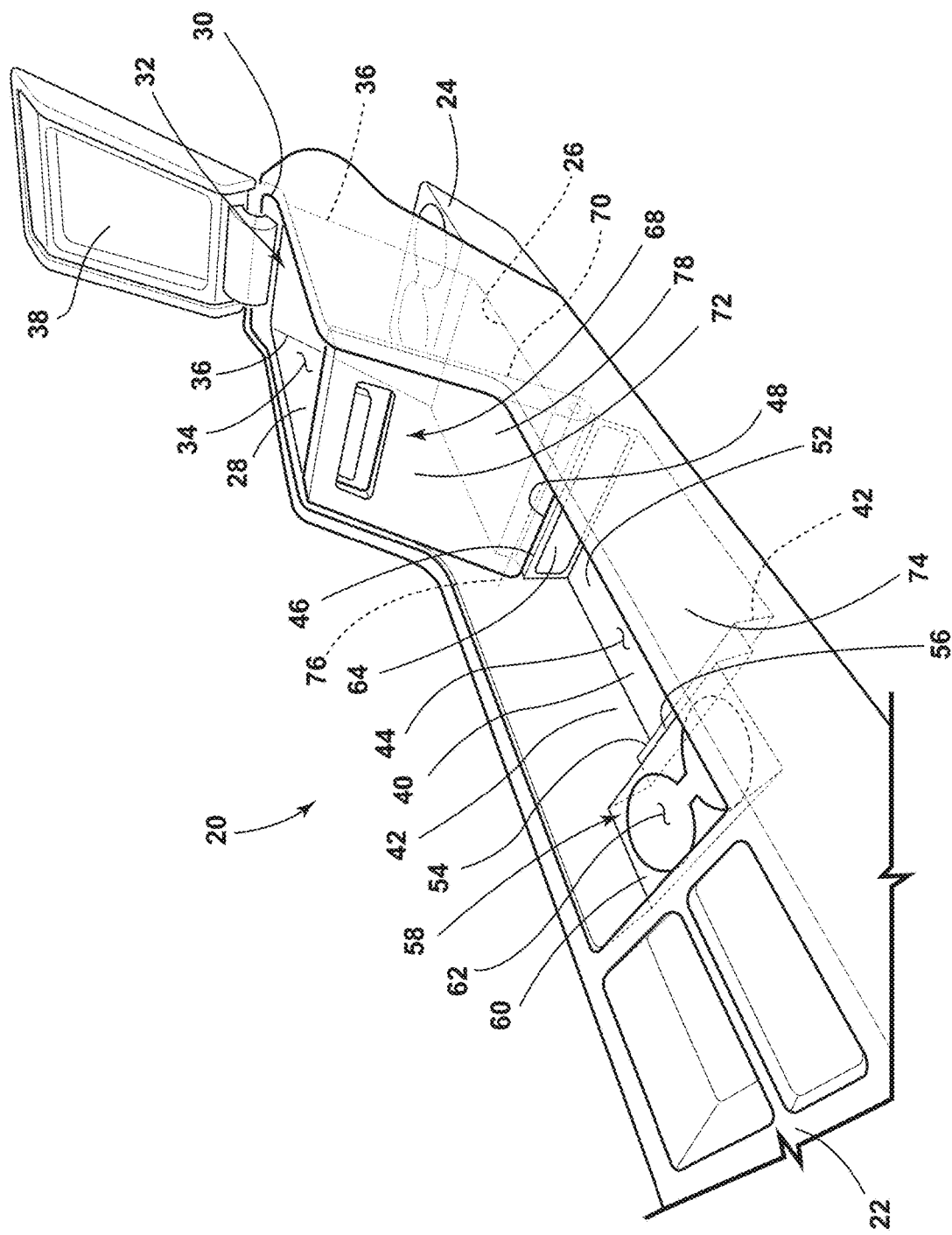
FIG. 3 is a top perspective view of the console assembly, illustrating the door in an open position, the panel in the first position, and the tray in the stowed position, according to one embodiment.

Referring now to FIGS. 2-5, the console assembly 20 may include the compartment floor 26. The compartment floor 26 may be positioned proximate to the rear end 24 of the console assembly 20. As illustrated in FIG. 3, a compartment side wall 28 may extend from the compartment floor 26 to the upper rim 30 of the compartment side wall 28. As described further herein, the upper rim 30 of the compartment side wall 28 may generally define an upper opening 32 to the compartment 34 of the console assembly 20, in some implementations.

In some embodiments, the compartment side wall 28 may include one or more corners 36. For example, in the embodiment illustrated in FIG. 3, the compartment side wall 28 includes two corners 36 that are proximate to the rear end 24 of the console assembly 20. In the illustrated embodiment, the compartment side wall 28 extends laterally between the two corners 36, and the compartment side wall 28 extends forward from both corners 36 toward the front end 22 of the console assembly 20.

Referring now to FIGS. 2 and 3, in various embodiments, the console assembly 20 may include a door 38. The door 38 may be operably coupled to the compartment side wall 28 and movable between a closed position, as illustrated in FIG. 2, and an open position, as illustrated in FIG. 3. In various embodiments, the door 38 may be operable to pivot between the open and closed positions. For example, in the embodiment illustrated in FIGS. 2 and 3, the door 38 is operably coupled to the portion of the compartment side wall 28 that extends between the two corners 36 of the compartment side wall 28, such that the door 38 is pivotable from the closed position, illustrated in FIG. 2, to the open position, illustrated in FIG. 3. As described further herein, access may be provided to the upper opening 32 of the compartment 34 in the open position of the door 38, and the door 38 may cover the upper opening 32 of the compartment 34 in the closed position, as illustrated in FIG. 2. In other words, the compartment 34 may be accessible via the upper opening 32 when the door 38 is in the open position, and the door 38 may cover the upper opening 32 of the compartment 34 while in the closed position, such that access to the compartment 34 via the upper opening 32 is unavailable.

Referring still to FIGS. 2 and 3, in various embodiments, the console assembly 20 may include the receptacle floor 40. The receptacle floor 40 may be in a spaced relationship with the compartment floor 26 of the console assembly 20. In the embodiment illustrated in FIG. 2, the receptacle floor 40 is nearer than the compartment floor 26 to the front end 22 of the console assembly 20. Further, the receptacle floor 40 is vehicle-downward of the compartment floor 26. The console assembly 20 may further include the receptacle side wall 42, which may extend upward from the receptacle floor 40 to define the receptacle 44.

Referring still to FIGS. 2 and 3, in some embodiments, the console assembly 20 may include a first shelf 46. The first shelf 46 may be positioned between the receptacle floor 40 and the compartment floor 26. For example, as illustrated in FIG. 2, the first shelf 46 is positioned nearer than the compartment floor 26 to the front end 22 of the console assembly 20 and nearer than the receptacle floor 40 to the rear end 24 of the console assembly 20. As further illustrated in FIG. 2, in various embodiments, the receptacle floor 40 may be positioned vehicle-downward of the first shelf 46, and the compartment floor 26 may be positioned vehicle-upward of the first shelf 46. In some embodiments, a surface 48 of the first shelf 46 may be parallel to the surface 50 of the compartment floor 26 and a surface 52 of the receptacle floor 40. As illustrated in FIG. 3, in some embodiments, a portion of the receptacle side wall 42 may extend upward from the receptacle floor 40 to the first shelf 46 positioned between the compartment floor 26 and the receptacle floor 40.

Referring still to FIGS. 2 and 3, in various embodiments, the console assembly 20 may include a second shelf 54. The second shelf 54 may be in a spaced relationship with the first shelf 46, such that the receptacle floor 40 is positioned between the first and second shelves 46, 54. As illustrated in FIG. 3, the first shelf 46 is nearer than the receptacle floor 40 to the rear end 24 of the console assembly 20, and the second shelf 54 is nearer than the receptacle floor 40 to the front end 22 of the console assembly 20. In various embodiments, the second shelf 54 may be vehicle-upward of the receptacle floor 40. In some embodiments, a portion of the receptacle side wall 42 may extend vehicle-upward from the receptacle floor 40 to the second shelf 54, as illustrated in FIG. 3. In some implementations, a surface 56 of the second shelf 54 may be substantially planar with the surface 48 of the first shelf 46.

Referring still to FIGS. 2 and 3, in some embodiments, the console assembly 20 may include a platform 58. The platform 58 may be in a spaced relationship with the compartment floor 26, such that the first and second shelves 46, 54 and the receptacle floor 40 are positioned between the platform 58 and the compartment floor 26, as illustrated in FIG. 3. In some embodiments, a surface 60 of the platform 58 may be substantially planar with the surface 50 of the compartment floor 26. In some embodiments, the platform 58 may define the cup holder opening 62. For example, as illustrated in FIGS. 2 and 3, the platform 58 defines first and second cup holder openings 62. The cup holder openings 62 may be configured to receive beverage containers for storage therein. In some embodiments, the cup holder openings 62 may be configured to receive cup holder components that are configured to receive beverage containers for storage therein.

Figure 4:
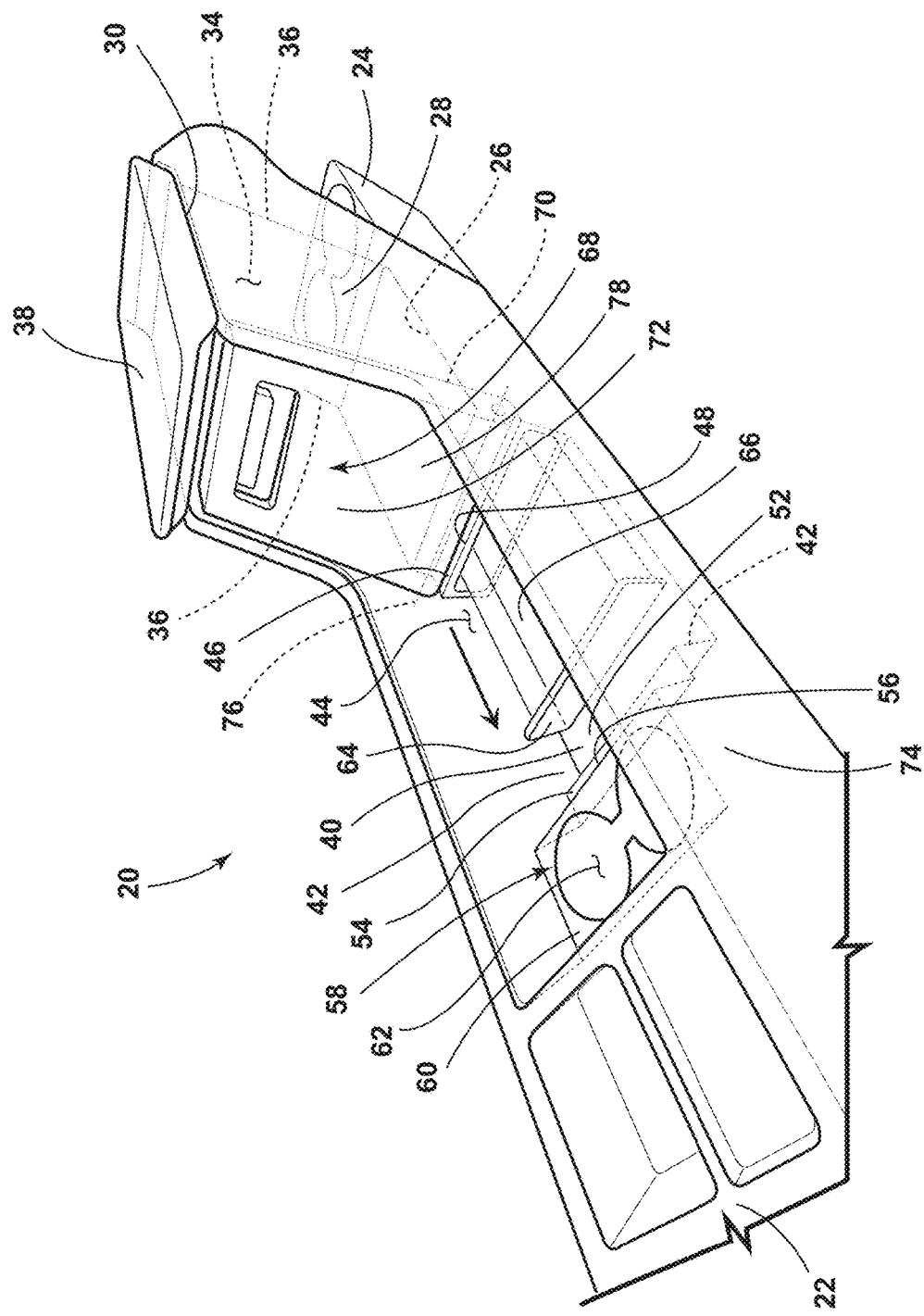
FIG. 4 is a top perspective view of the console assembly, illustrating the door in the closed position, the panel in the first position, and the tray in a deployed position, according to one embodiment.

Referring now to FIGS. 2 and 4, in some embodiments, the console assembly 20 may include a tray 64. The tray 64 may be operable to move between a stowed position and a deployed position. In some embodiments, the tray 64 may be positioned beneath the compartment floor 26 in the stowed position. In other words, the tray 64 may be positioned directly vehicle-downward of the compartment floor 26 while in the stowed position, as illustrated in FIG. 2. In some embodiments, the tray 64 may be positioned within the receptacle 44 of the console assembly 20 in the deployed position of the tray 64, as illustrated in FIG. 4. In the illustrated embodiment, the tray 64 is configured to slide between the stowed and deployed positions. A variety of modes of movement are contemplated (e.g., rolling, translation, unfurling, pivoting, etc.). As illustrated in FIG. 4, the tray 64 defines a storage cavity 66 for receiving items for storage therein. It is contemplated that the tray 64 may include a variety of storage mechanisms, in some embodiments. For example, the tray 64 may include beverage container retention features (not shown) that are configured to retain beverage containers in the deployed position of the tray 64.

Figure 5:
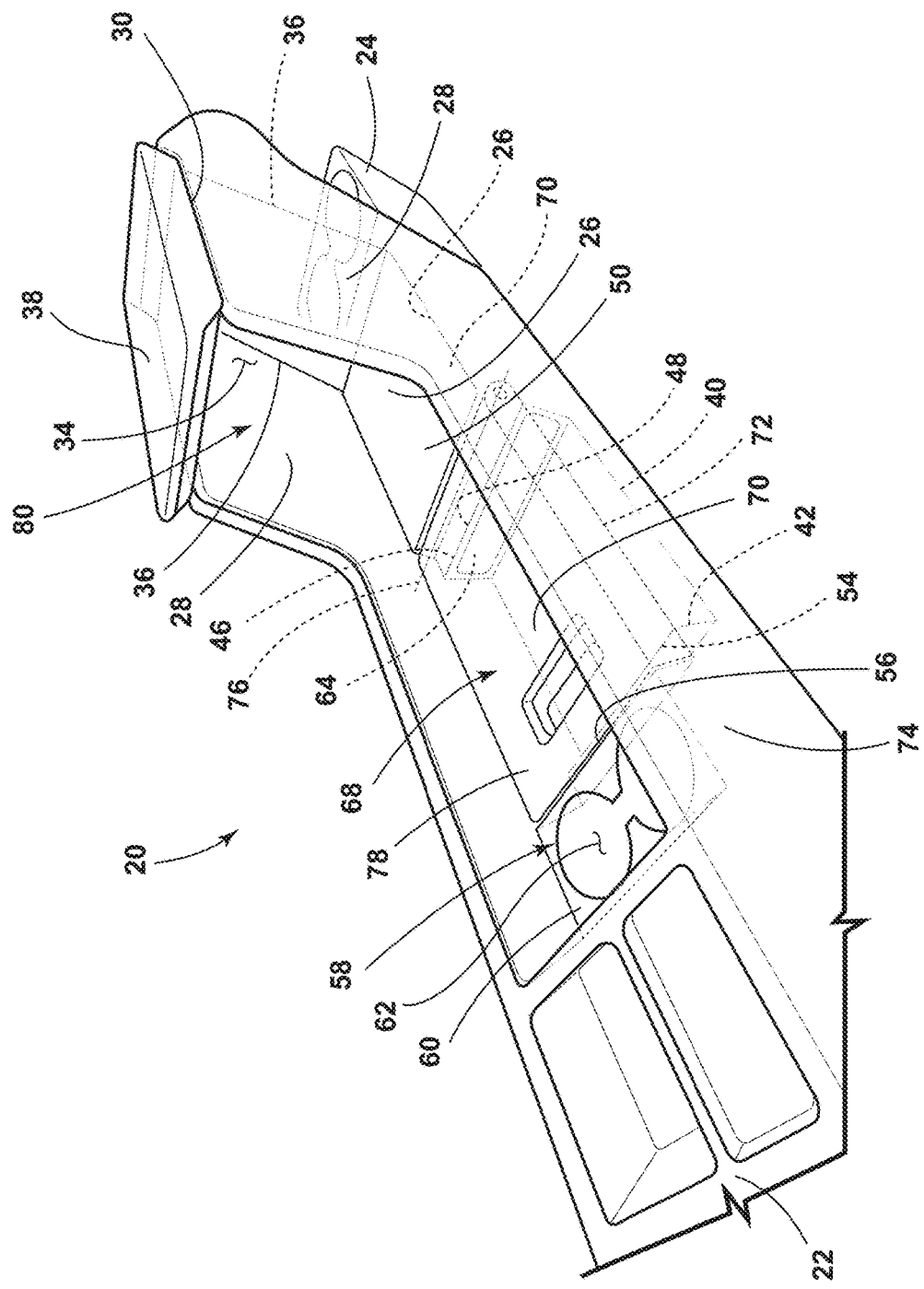
FIG. 5 is a top perspective view of the console assembly, illustrating the door in the closed position, the panel in a second position, and the tray in the stowed position, according to one embodiment.

Referring now to FIGS. 2 and 5, in various embodiments, the console assembly 20 includes the panel 68. The panel 68 may include a first side 70 and a second side 72 opposite the first side 70. The panel 68 may be operable to pivot between a first position, as illustrated in FIG. 2, and a second position, as illustrated in FIG. 5. The panel 68 may be pivotably coupled to one or more of a variety of components of the console assembly 20, in various embodiments. For example, in some embodiments, the panel 68 may be pivotably coupled to the first shelf 46. In the embodiment illustrated in FIGS. 2 and 5, the panel 68 is pivotably coupled to a body 74 of the console assembly 20 that forms the compartment side wall 28 and portions of the receptacle side wall 42.

As illustrated in FIGS. 2 and 5, the panel 68 is operable to pivot between the first and second positions about a pivot axis 76. In various embodiments, the pivot axis 76 may extend vehicle-laterally. In other words, the pivot axis 76 may extend in a direction that is perpendicular to the vehicle-forward direction and perpendicular to the vehicle-upward direction. As illustrated in FIG. 2, the pivot axis 76 may be positioned above the first shelf 46 of the console assembly 20 and vehicle-downward of the compartment floor 26. In other words, the pivot axis 76 may be positioned directly vehicle-upward of the first shelf 46 and may be positioned vehicle-downward of the compartment floor 26.

Referring still to FIGS. 2 and 5, in some embodiments, the panel 68, the compartment side wall 28, and the compartment floor 26 may define the compartment 34 of the console assembly 20 in the first position of the panel 68. For example, as illustrated in FIG. 2, the panel 68 is in the first position, such that the first side 70 of the panel 68 faces the compartment 34 and defines the compartment 34 along with the compartment side wall 28 and the compartment floor 26. In the first position, the panel 68 defines the upper opening 32 along with the upper rim 30 of the compartment side wall 28, as illustrated in FIG. 3.

Referring now to FIG. 5, in some embodiments, a surface 78 of the first side 70 of the panel 68 may be substantially planar with a surface 50 of the compartment floor 26. Further, as shown in the illustrated embodiment, the surface 78 of the first side 70 of the panel 68 may be substantially planar with the surface 60 of the platform 58 in the second position of the panel 68. In various embodiments, the panel 68 may cover the receptacle 44 of the console assembly 20 while the panel 68 is in the second position. In the embodiment illustrated in FIG. 5, the panel 68 is pivoted vehicle-forward from the first position to the second position, such that the panel 68 covers the receptacle 44, the second side 72 of the panel 68 faces the receptacle 44 and a portion of the second side 72 is in contact with the surface 56 of the second shelf 54, and the surface 78 of the first side 70 of the panel 68 is substantially planar to the surface 50 of the compartment floor 26 and the surface 56 of the second shelf 54. Referring now to FIGS. 2-5, in some embodiments, an upper periphery of the receptacle 44 may be defined by a plane of the surfaces 48, 56 of the first and second shelves 46, 54. Further, the receptacle 44 may be bounded by the portions of the receptacle side wall 42 extending from the receptacle floor 40 to the first shelf 46 and the second shelf 54. In some embodiments, the door 38 may be operable to pivot a first direction from the closed position to the open position, and the panel 68 may be operable to pivot a second direction from the first position to the second position, wherein the second direction is opposite the first direction. For example, as illustrated in FIGS. 2, 3, and 5, the direction that the door 38 pivots from the closed position, as illustrated in FIG. 2, to the open position, as illustrated in FIG. 3, is opposite of the direction that the panel 68 pivots from the first position, as illustrated in FIG. 2, to the second position, as illustrated in FIG. 5. In various embodiments, the panel 68 may be operable to enter the second position while the tray 64 is in the deployed position.

In operation of an exemplary embodiment of the console assembly 20 described herein, the console assembly 20 may initially be configured with the panel 68 in the first position, such that the compartment 34 is defined by the compartment floor 26, the compartment side wall 28, and the first side 70 of the panel 68. In this configuration, the user may access the compartment 34 through the upper opening 32 by moving the door 38 to the open position, as illustrated in FIG. 3. Further, the user may access items stored in the tray 64 by moving the tray 64 from the stowed position to the deployed position, as illustrated in FIG. 4. If the user desires to store an item within the console assembly 20 that does not fit within the compartment 34 or the receptacle 44, the user may move the panel 68 from the first position to the second position, as illustrated in FIG. 5. In the second position of the panel 68, the surface 78 of the first side 70 of the panel 68 is substantially planar with the surface 50 of the compartment floor 26 and the surface 60 of the platform 58. In this configuration, the user may place the item on top of the platform 58, the first side 70 of the panel 68, and/or the compartment floor 26 to store the item within the console assembly 20.

The console assembly 20 of the present disclosure may provide a variety of advantages. First, the first side 70 of the panel 68, in combination with the compartment side wall 28 and the compartment floor 26, provides a storage area for items in the form of the compartment 34. Second, the panel 68 being movable from the first position to the second position may allow the user to access items within the compartment 34 through a side opening 80 in the event that an item is resting on top of the door 38 of the compartment 34, such that it would be inconvenient to move the door 38 from the closed position to the open position to access the compartment 34. Third, in the second position of the panel 68, the receptacle 44 is covered, which may conveniently conceal items stored within the receptacle 44. Fourth, in the second position, the surface 78 of the first side 70 of the panel 68 being substantially planar to the surface 50 of the compartment floor 26 and/or the surface 60 of the platform 58 may provide a generally uniform resting place for items to be stored within the console assembly 20, and may contribute to a streamlined aesthetic. Fifth, in the second position of the panel 68 and the open position of the door 38, an item, such as a duffle bag, that is too tall to fit under the door 38 in the closed position and too long to fit within the compartment 34 in the first position of the panel 68 may still generally be secured in place by the side wall 28.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A console assembly for a vehicle, comprising:
a compartment side wall that extends from a compartment floor to an upper rim of the compartment side wall;
a receptacle side wall that extends upward from a receptacle floor to define a receptacle; and
a panel having a first side and a second side opposite the first side, the panel being pivotable between a first position, wherein the panel, the compartment side wall, and the compartment floor define a compartment and wherein the first side of the panel faces the compartment, and a second position, wherein the panel covers the receptacle and a surface of the first side of the panel is substantially planar with a surface of the compartment floor.

2. The console assembly of claim 1, further comprising:
a door operably coupled to the compartment side wall and movable between open and closed positions, wherein, in the first position of the panel, access is provided to an upper opening of the compartment in the open position of the door, and the door covers the upper opening of the compartment in the closed position.

3. The console assembly of claim 2, wherein the door is operable to pivot a first direction from the closed position to the open position, and the panel is operable to pivot a second direction from the first position to the second position, wherein the second direction is opposite the first direction.

4. The console assembly of claim 1, further comprising:
a tray operable to move between a stowed position, wherein the tray is positioned beneath the compartment floor, and a deployed position, wherein the tray is positioned within the receptacle.

5. The console assembly of claim 1, further comprising:
a first shelf positioned between the receptacle floor and the compartment floor, wherein the receptacle floor is positioned vehicle-downward of the first shelf, and the compartment floor is positioned vehicle-upward of the first shelf.

6. The console assembly of claim 5, wherein the panel is operable to pivot between the first and second positions about a pivot axis, wherein the pivot axis is positioned above the first shelf and vehicle-downward of the compartment floor.

7. The console assembly of claim 5, further comprising:
a second shelf in a spaced relationship with the first shelf, such that the receptacle floor is positioned between the first and second shelves, wherein a portion of the panel contacts the second shelf in the second position of the panel.

8. The console assembly of claim 7, further comprising:
a platform in a spaced relationship with the compartment floor, such that the first and second shelves and the receptacle floor are positioned between the platform and the compartment floor, wherein a surface of the platform is substantially planar with the surface of the first side of the panel and the surface of the compartment floor in the second position of the panel.

9. The console assembly of claim 8, wherein the platform defines a cup holder opening.

10. A console assembly for a vehicle, comprising:
a compartment side wall extending upward from a compartment floor; and
a panel having a first side and a second side opposite the first side and being pivotable between a first position, wherein the compartment side wall, compartment floor, and first side of the panel define a compartment, and a second position, wherein a surface of the first side of the panel is substantially planar to a surface of the compartment floor.

11. The console assembly of claim 10, further comprising:
a receptacle floor in a spaced relationship with the compartment floor; and
a receptacle side wall extending outward from the receptacle floor to define a receptacle, wherein the panel covers the receptacle in the second position.

12. The console assembly of claim 11, further comprising:
a tray operable to move between a stowed position, wherein the tray is positioned beneath the compartment floor, and a deployed position, wherein the tray is positioned within the receptacle.

13. The console assembly of claim 11, further comprising:
a first shelf positioned between the receptacle floor and the compartment floor, wherein the receptacle floor is positioned vehicle-downward of the first shelf, and the compartment floor is positioned vehicle-upward of the first shelf.

14. The console assembly of claim 13, wherein the panel is operable to pivot between the first and second positions about a pivot axis, wherein the pivot axis is positioned above the first shelf and vehicle-downward of the compartment floor.

15. The console assembly of claim 13, further comprising:
a second shelf in a spaced relationship with the first shelf, such that the receptacle floor is positioned between the first and second shelves, wherein a portion of the panel contacts the second shelf in the second position of the panel.

16. The console assembly of claim 15, further comprising:
a platform in a spaced relationship with the compartment floor, such that the first and second shelves and the receptacle floor are positioned between the platform and the compartment floor, wherein a surface of the platform is substantially planar with the surface of the first side of the panel and the surface of the compartment floor in the second position of the panel.

17. The console assembly of claim 10, further comprising:
a door operably coupled to the compartment side wall and movable between open and closed positions, wherein, in the first position of the panel, access is provided to an upper opening of the compartment in the open position of the door, and the door covers the upper opening of the compartment in the closed position.

18. The console assembly of claim 17, wherein the door is operable to pivot a first direction from the closed position to the open position, and the panel is operable to pivot a second direction from the first position to the second position, wherein the second direction is opposite the first direction.

19. A console assembly for a vehicle, comprising
a compartment side wall extending upward from a compartment floor;
a panel pivotable between a first position, wherein the compartment side wall, compartment floor, and panel define a compartment, and a second position, wherein the panel covers a receptacle adjacent to the compartment; and
a tray operable to move between a stowed position, wherein the tray is positioned beneath the compartment floor, and a deployed position, wherein the tray is positioned within the receptacle.

20. The console assembly of claim 19, wherein the panel includes a first side and a second side opposite the first side, wherein the first side of the panel defines the compartment with the compartment side wall and compartment floor in the first position, and wherein a surface of the first side of the panel is substantially planar to a surface of the compartment floor in the second position.

* * * * *